(12) United States Patent
Lemus et al.

(10) Patent No.: US 8,810,735 B2
(45) Date of Patent: Aug. 19, 2014

(54) DYNAMIC REMOTE CONTROL SYSTEMS AND METHODS

(75) Inventors: Anthony M. Lemus, Irving, TX (US); Brian F. Roberts, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 280 days.

(21) Appl. No.: 12/971,894

(22) Filed: Dec. 17, 2010

(65) Prior Publication Data

US 2012/0154689 A1 Jun. 21, 2012

(51) Int. Cl.
| | |
|---|---|
| *H04N 5/44* | (2011.01) |
| *H04N 5/14* | (2006.01) |
| *H04N 9/64* | (2006.01) |
| *G06F 3/00* | (2006.01) |
| *G06F 13/00* | (2006.01) |
| *H04N 5/445* | (2011.01) |
| *H04N 21/442* | (2011.01) |
| *H04N 21/422* | (2011.01) |

(52) U.S. Cl.
CPC ..... *H04N 21/42227* (2013.01); *H04N 21/4424* (2013.01); *H04N 21/44213* (2013.01); *H04N 21/4222* (2013.01)
USPC ........... 348/734; 348/700; 348/E5.67; 725/37

(58) Field of Classification Search
None
See application file for complete search history.

(56) References Cited

U.S. PATENT DOCUMENTS

| | | | |
|---|---|---|---|
| 6,407,779 B1 * | 6/2002 | Herz | 348/734 |
| 6,918,136 B2 * | 7/2005 | Shepherd | 725/141 |
| 7,271,732 B2 * | 9/2007 | Harada | 340/4.3 |
| 2003/0103165 A1 * | 6/2003 | Bullinger et al. | 348/569 |
| 2004/0237052 A1 * | 11/2004 | Allport | 715/840 |
| 2009/0058882 A1 * | 3/2009 | Adachi et al. | 345/650 |
| 2009/0079594 A1 * | 3/2009 | Arling et al. | 341/22 |
| 2009/0254778 A1 * | 10/2009 | Huang et al. | 714/38 |

* cited by examiner

*Primary Examiner* — Nasser Goodarzi
*Assistant Examiner* — Adil Ocak (57) ABSTRACT

An exemplary method includes a dynamic remote control system detecting a change in an on-screen context of content being presented by a presentation device and dynamically changing a function and/or an appearance of a button included in a persistent number pad arrangement on a remote control device associated with the presentation device in response to the change in the on-screen context. Corresponding methods and systems are also disclosed.

22 Claims, 12 Drawing Sheets

DYNAMIC REMOTE CONTROL SYSTEMS AND METHODS

BACKGROUND INFORMATION

Set-top box devices have provided users of such devices with access to a large number and variety of media content programs and services. For example, a user may choose to experience a variety of broadcast television programs, pay-per-view services, video-on-demand programming, and audio programming via a set-top box device.

However, it is often cumbersome for a user to control how a set-top box device operates. For example, a traditional remote control device configured to control a set-top box device often includes a plethora of buttons, some of which are never utilized by the user. Hence, it is often difficult for a user to locate and select a sequence of buttons that may be required to perform a particular set-top box device operation. Moreover, different groups of buttons on a traditional remote control device are often spaced apart in a way that requires the user to physically move his and to re-grip the remote control device when switching between buttons. This can be cumbersome and difficult to perform for some users.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Dynamic remote control methods and systems are described herein. As described in more detail below, a dynamic remote control system may detect a change in an on-screen context of content being presented by a presentation device and, in response, dynamically change a function of one or more buttons included in a persistent number pad arrangement on a remote control device associated with the presentation device. Additionally or alternatively, the dynamic remote control system may dynamically change an appearance of the one or more buttons in response to the change in the on-screen context.

For example, the dynamic remote control system may detect that a user has used a remote control device to direct a presentation device (e.g., a set-top box device) to switch from presenting a media content instance (e.g., a television program) to presenting an interactive program guide on a display screen (e.g., a television) associated with the presentation device. In response, the dynamic remote control system may dynamically change the function of a plurality of buttons included in a persistent number pad arrangement on the remote control device by switching the buttons from being associated with numerical digits to being associated with directional pad functions (e.g., "arrow left," "arrow right," "arrow up," "arrow down," and "OK" functions). In this manner, as will be described in more detail below, the buttons may be used to easily navigate within the interactive program guide. Other exemplary implementations of the methods and systems described herein will be provided below.

As used herein, a "persistent number pad arrangement" refers to a stationary number pad arrangement disposed on or otherwise a part of a remote control device. In other words, the positioning of the buttons that are included in the persistent number pad arrangement does not change, although the appearance (e.g., color, shape, size, label, relative height, etc.) of the buttons may dynamically change as will be described below.

In some examples, the remote control device includes a dedicated remote control device (which may be physically separate from the presentation device) that has no other function other than to control an operation of one or more presentation devices. The dedicated remote control device may include physically distinct buttons disposed on a surface thereof. The physically distinct buttons may, as will be described in more detail below, be configured to dynamically change in appearance and/or function.

Alternatively, the remote control device may include a mobile device (e.g., a mobile phone device, a tablet computer, etc.) configured to emulate a dedicated remote control device. For example, a mobile device may execute an application configured to emulate a dedicated remote control device by displaying graphical representations of one or more buttons associated with the dedicated remote control device on a display screen of the mobile device.

As used herein, "content" that may be presented by a presentation device may include any graphical content that may be presented for display on a display screen associated with the presentation device. For example, the content may include media content, program guide content, menu content, search content, Web content, etc. "Media content" and "media content instance" will be used interchangeably herein to refer to any television program, on-demand media program, pay-per-view media program, broadcast media program (e.g., broadcast television program), IPTV media content, advertisement (e.g., commercial), video, movie, song, video game, image, photograph, sound, or any segment, component, or combination of these or other forms of media content that may be presented by the presentation device.

Figure 1:
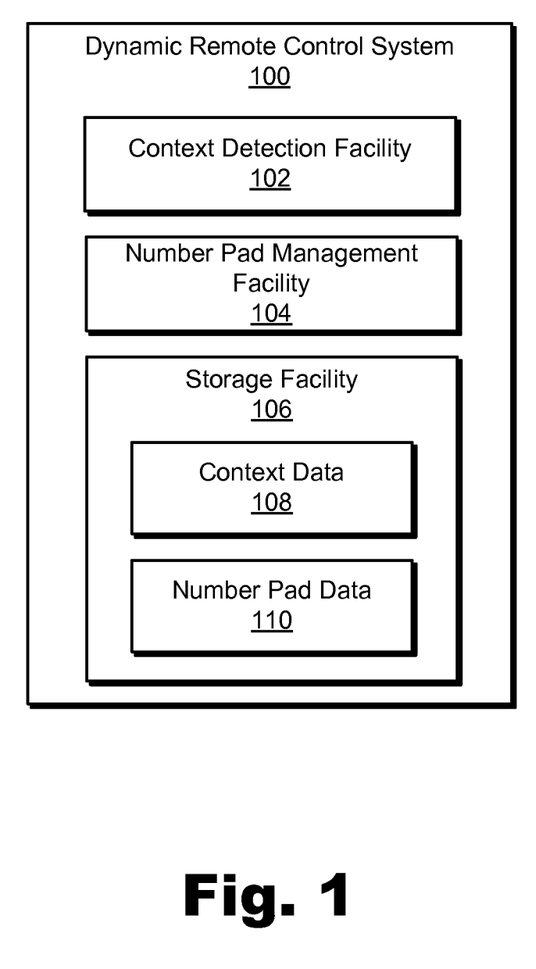
FIG. 1 illustrates an exemplary dynamic remote control system according to principles described herein.

FIG. 1 illustrates an exemplary dynamic remote control system 100 (or simply "system 100"). System 100 may be configured to dynamically change a function and/or appearance of one or more buttons that are a part of a remote control device in response to a change in an on-screen context of content being presented by a presentation device. In this manner, system 100 may facilitate control of the presentation device by a relatively simple and clutter-free (i.e., minimal button) remote control device, thereby resulting in an easy-to-use, convenient, and enjoyable media content experience for a user.

System 100 may include a context detection facility 102, a number pad management facility 104, and a storage facility 106, which may be in communication with one another using any suitable communication technologies. Each of these facilities will now be described.

Context detection facility 102 may be configured to detect a change in an on-screen context of content being presented by a presentation device. As used herein, an "on-screen context of content" refers to a particular presentation state of the presentation device. For example, an on-screen context may refer to or be representative of a particular media content instance (e.g., a movie or television program), menu option (e.g., interactive program guide), or other content being presented by the presentation device at a particular time. Additionally or alternatively, an on-screen context may refer to or be representative of a particular channel to which the presentation device is tuned, an identity of the user experiencing a media content instance being presented by the presentation device, and/or any other factor associated with a presentation of content by the presentation device.

For example, context detection facility 102 may detect when the presentation device switches from presenting a media content instance (e.g., a television program) to presenting an interactive program guide, a menu, or other type of content on a display screen (e.g., a television) associated with the presentation device. Context detection facility 102 may also detect a change in on-screen context that occurs when the user selects a particular media content instance listed in the interactive program guide for presentation by the presentation device.

Context detection facility 102 may further be configured to detect a change in the type of media content being presented by the presentation device. For example, context detection facility 102 may detect when the presentation device switches from presenting a television program to presenting an advertisement during an advertisement break associated with the television program. Context detection facility 102 may detect any other change in on-screen context as may serve a particular implementation.

Context detection facility 102 may detect a change in on-screen context in any suitable manner. For example, the presentation device, a server (e.g., a server associated with a service provider), and/or any other device may transmit data representative of the change in on-screen context to context detection facility 102.

Number pad management facility 104 may be configured to manage or perform one or more operations associated with a persistent number pad arrangement that is a part of a remote control device associated with (i.e., configured to control) the presentation device. To this end, number pad management facility 104 may include or be in communication with any suitable combination of computing devices, mechanical means, and/or software applications configured to perform the one or more number pad operations.

In some examples, number pad management facility 104 may be configured to dynamically change a function of one or more buttons included in the persistent number pad arrangement on the remote control device in response to a change in an on-screen context as detected by context detection facility 102. Number pad management facility 104 may dynamically change the function of a button in any suitable manner as may serve a particular implementation.

To illustrate, a button included in the number pad may, by default, be associated with a particular numerical digit (e.g., 0, 1, 2, 3, etc.) and may be configured to direct the remote control device to transmit a command representative of the numerical digit to the presentation device in response to a user selecting (e.g., pressing) the button. In response to a change in an on-screen context of content being presented by the presentation device, number pad management facility 104 may dynamically change the function of the button by associating the button with a directional pad function, a gaming device function, a media content trick play function, and/or any other type of function as may serve a particular implementation.

As used herein, a "directional pad function" may refer to any function associated with a directional pad that may be a part of a remote control device. For example, a directional pad function may refer to an "arrow left" function, an "arrow right" function, an "arrow up" function, an "arrow down" function, or an "OK" function.

A "gaming device function" may refer to any function associated with a gaming device or gaming device controller that may be associated with the presentation device and/or a display screen associated with the presentation device. For example, a gaming device function may include, but is not limited to, a particular user input button (e.g., an "A", "B", "X", or "Y" input button) associated with a gaming device controller.

A "media content trick play function" may refer to any function associated with a trick play presentation of a media content instance (e.g., a recorded media content instance). For example, a media content trick play function may include, but is not limited to, a "play" function, a "rewind" function, a "fast forward" function, a "pause" function, a "stop" function, a "skip" function, and/or any other type of trick play function as may serve a particular implementation.

Number pad management facility 104 may associate the button with a new or different function in any suitable manner as may serve a particular implementation. For example, number pad management facility 104 may reassign or remap the button to a new type of input command that is transmitted to the presentation device in response to user selection of the button. To illustrate, a particular button may initially be associated with the number "2" and may therefore cause the remote control device to transmit an input command representative of the number "2" to the presentation device in response to user selection of the button. Subsequently, and in response to a change in on-screen context, number pad management facility 104 may associate the button with an "arrow down" function by reassigning the button to a different input command representative of the "arrow down" function. After the button has been reassigned to the new input command, user selection of the button may cause the remote control device to transmit an "arrow down" input command instead of an input command representative of the number "2".

Alternatively, number pad management facility 104 may associate the button with a new or different function by directing the presentation device to change a manner in which it interprets an input command received from the remote control device in response to user selection of the button. To illustrate, a particular button may initially be associated with the number "2" as described above. Subsequently, and in response to a change in on-screen context, number pad management facility 104 may associate the button with an "arrow down" function by directing the presentation device to interpret an input command received from the remote control device in response to user selection of the button as being associated with the "arrow down" function instead of the number "2".

Number pad management facility 104 may be additionally or alternatively configured to dynamically change an appearance of one or more buttons included in the persistent number pad arrangement on the remote control device in response to a change in an on-screen context as detected by context detection facility 102.

Number pad management facility 104 may dynamically change the appearance of a button in any suitable manner as may serve a particular implementation. For example, as will be described in more detail below, number pad management facility 104 may change at least one of a physical size of the button, a relative height of the button with respect to one or more other buttons included in the persistent number pad arrangement, a color of the button, a label of the button, and/or any other appearance attribute of the button.

In some examples, the change in appearance of the button is configured to depict a change in function of the button. For example, a button may be initially circular in shape to indicate that it is associated with a numerical digit. The function of the button may be subsequently changed to a trick play function (e.g., rewind). The appearance of the button may be correspondingly changed to a backwards facing triangle to depict the newly associated rewind function.

Number pad management facility 104 may be additionally or alternatively configured to log data representative of an interaction by a user with a button over a period of time and dynamically change, based on the logged data, an appearance of the button over the period of time. For example, number pad management facility 104 may be configured to detect that a user selects a particular button more often than other buttons that are a part of a remote control device. Over time, an appearance (e.g., a color, size, and/or relative height) of the button may be changed by number pad management facility 104 to make it easier for the user to locate and select the button.

Storage facility 106 may be configured to maintain context data 108 generated or utilized by context detection facility 102 and number pad data 110 generated or utilized by number pad management facility 104. Storage facility 106 may maintain additional or alternative data as may serve a particular implementation.

Figure 2A:
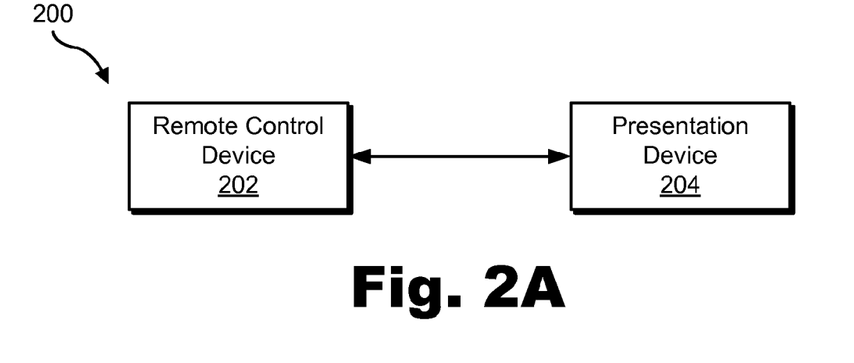
FIGS. 2A-2C illustrate exemplary implementations of the system of FIG. 1 according to principles described herein.
Figure 2B:
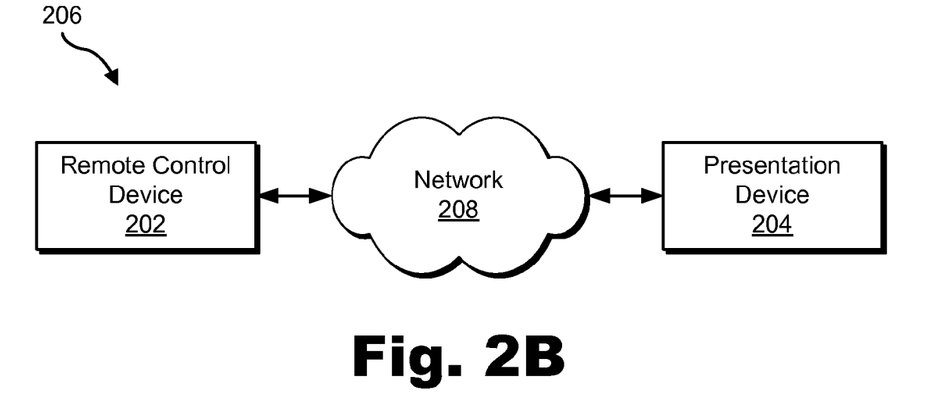
Figure 2C:
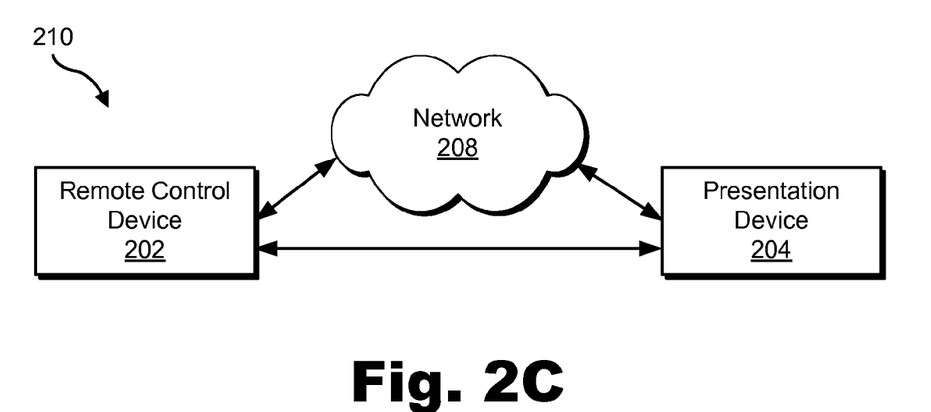

FIGS. 2A-2C illustrate exemplary implementations of system 100. Implementation 200 shown in FIG. 2A includes a remote control device 202 and a presentation device 204 configured to communicate directly one with another. Implementation 206 shown in FIG. 2B includes remote control device 202 and presentation device 204 configured to communicate by way of a network 208. Implementation 210 shown in FIG. 2C includes remote control device 202 and presentation device 204 configured to communicate directly and by way of network 208. Implementation 210 may be a hybrid version of implementations 200 and 206 and may provide for certain communications between remote control device 202 and presentation device 204 to be direct communications and other communications between remote control device 202 and presentation device 204 to be by way of network 208.

Direct communications between remote control device 202 and presentation device 204 may include infrared signals (e.g., infrared codes), radio frequency signals, Bluetooth connection signals, other wireless signals, signals transmitted over a direct wired connection between remote control device 202 and presentation device 204, and any/or other suitable direct communications between remote control device 202 and presentation device 204. Communications between remote control device 202 and presentation device 204 by way of network 208 may include any suitable network-carried communications such as TCP, IP, TCP/IP, Wi-Fi, Ethernet, etc. connections. Network 208 may include one or more networks or types of networks (and communication links thereto) capable of carrying signals between remote control device 202 and presentation device 204. For example, network 208 may include, but is not limited to, one or more local area networks (e.g., a home Wi-Fi and/or Ethernet network).

Remote control device 202 may include any user-operable device implementing one or more facilities 102-106 of system 100 such that remote control device 202 may remotely control presentation device 204 by transmitting one or more input commands to presentation device 204. As mentioned, remote control device 202 may include a dedicated remote control device or a mobile device (e.g., a mobile phone device, a tablet computer, etc.) configured to emulate a dedicated remote control device.

Presentation device 204 may include any device that may be remotely controlled by remote control device 202. For example, presentation device 204 may include, but is not limited to, a set-top box device, a digital video recording ("DVR") device, a multi-room DVR device, a media content processing device, a personal computer, a gaming device, a television device, and/or any device configured to facilitate access to one or more forms of media content.

Presentation device 204 may implement one or more facilities 102-106 of system 100. For example, presentation device 204 may be configured to detect a change in an on-screen context of content being presented by presentation device 204 and transmit data representative of the change in on-screen context to remote control device 202.

Figure 3A:
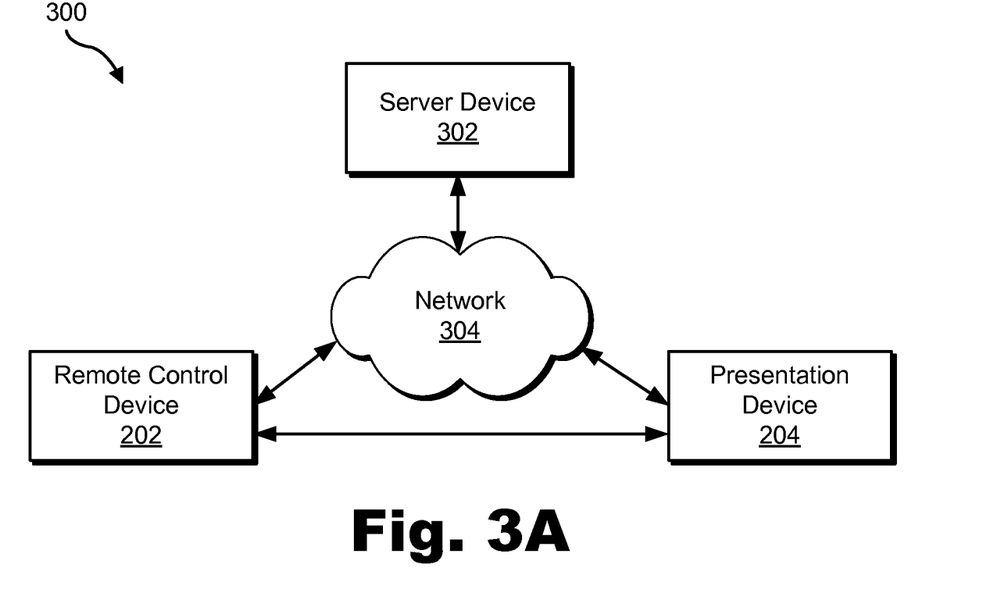
FIGS. 3A-3B illustrate additional exemplary implementations of the system of FIG. 1 according to principles described herein.
Figure 3B:
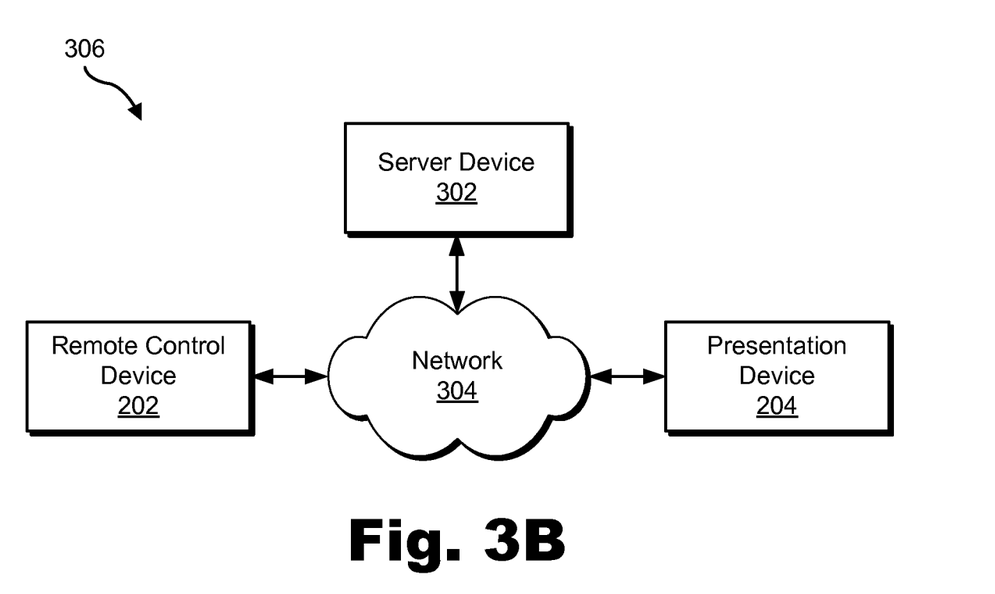

FIGS. 3A-3B illustrate additional exemplary implementations of system 100. Implementation 300 shown in FIG. 3A includes a remote control device 202 and a presentation device 204 configured to communicate directly one with another and a server device 302 configured to communicate with either or both of remote control device 202 and presentation device 204 by way of a network 304. Implementation 306 shown in FIG. 3B includes remote control device 202, presentation device 204, and server device 302 configured to communicate with one another by way of network 304. In implementations 300 and 306, communications between remote control device 202 and presentation device 204 may be as described above for implementations 200 and 206, respectively. In addition, at least one of remote control device 202 and presentation device 204 may be configured to communicate with server device 302 by way of network 304 using any suitable network-based communication technologies (e.g., TCP, IP, TCP/IP, Wi-Fi, Ethernet, FTP, HTTP, HTTPS, SIP, SOAP, XML and variations thereof, Simple Mail Transfer Protocol ("SMTP"), RTP, UDP, etc. types of communications).

In addition or alternative to the examples of networks and types of networks that may be included in network 208, network 304 may include one or more additional or alternative networks or types of networks to support communications with server device 302, including, without limitation, wireless data networks (e.g., a mobile data network), subscriber television networks (e.g., broadcast, multicast, and/or narrowcast television networks), satellite networks, cable networks, hybrid fiber coax networks, broadband networks, the Internet, wide area networks, and any other networks capable of carrying data and/or communications signals between server device 302 and either or both remote control device 202 and presentation device 204.

Accordingly, server device 302 may implement one or more facilities 102-106 of system 100. For example, server device 302 may be associated with (e.g., managed by) a service provider that provides the content presented by presentation device 204 and may be accordingly configured to detect a change in an on-screen context of content being presented by presentation device 204. Server device 302 may be further configured to transmit data representative of the change in on-screen context to remote control device 202 and/or perform one or more of the number pad management operations described herein.

Figure 4:
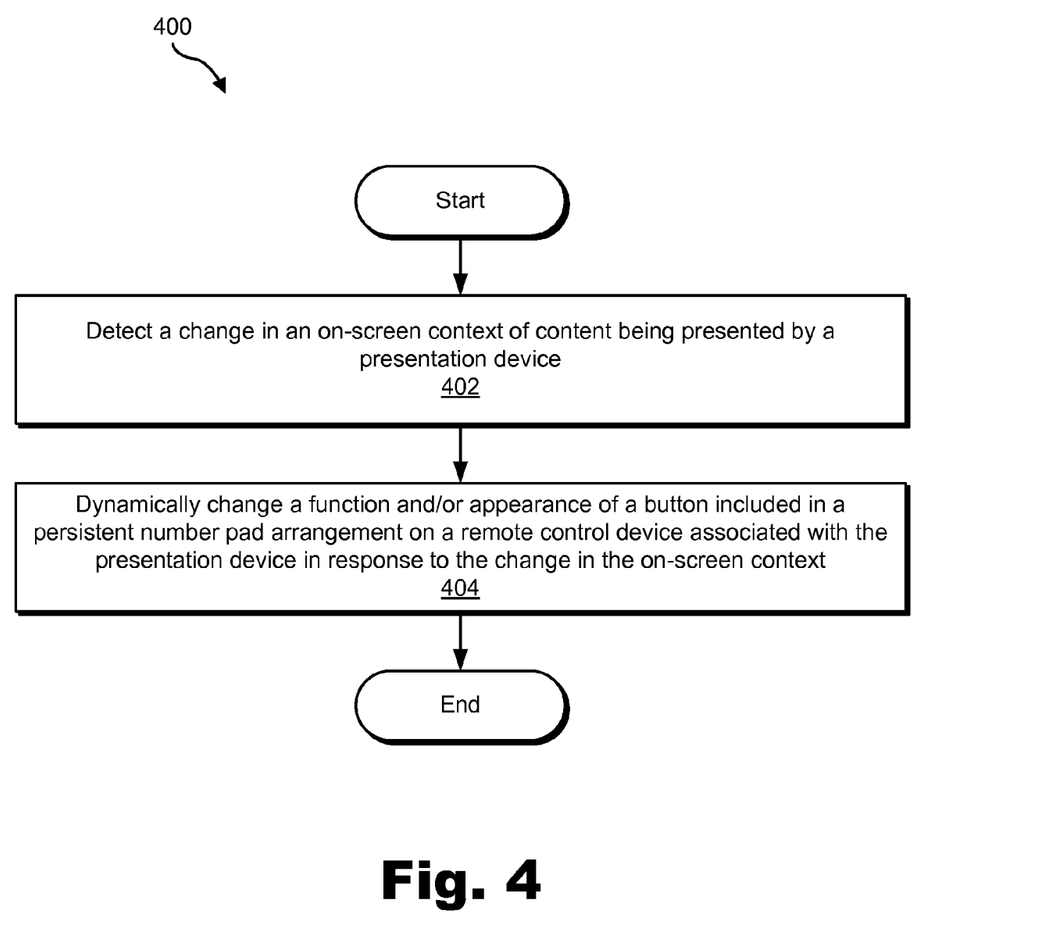
FIG. 4 illustrates an exemplary dynamic remote control method according to principles described herein.

FIG. 4 illustrates an exemplary dynamic remote control method 400. While FIG. 4 illustrates exemplary steps according to one embodiment, other embodiments may omit, add to, reorder, and/or modify any of the steps shown in FIG. 4. The steps shown in FIG. 4 may be performed by any component or combination of components of system 100, remote control device 202, presentation device 204, and/or server device 302.

In step 402, a change in an on-screen context of content being presented by a presentation device is detected. Step 402 may be performed in any of the ways described herein.

In step 404, a function and/or appearance of a button included in a persistent number pad arrangement on a remote control device associated with the presentation device is dynamically changed in response to the change in the on-screen context. Step 404 may be performed in any of the ways described herein.

Figure 5:
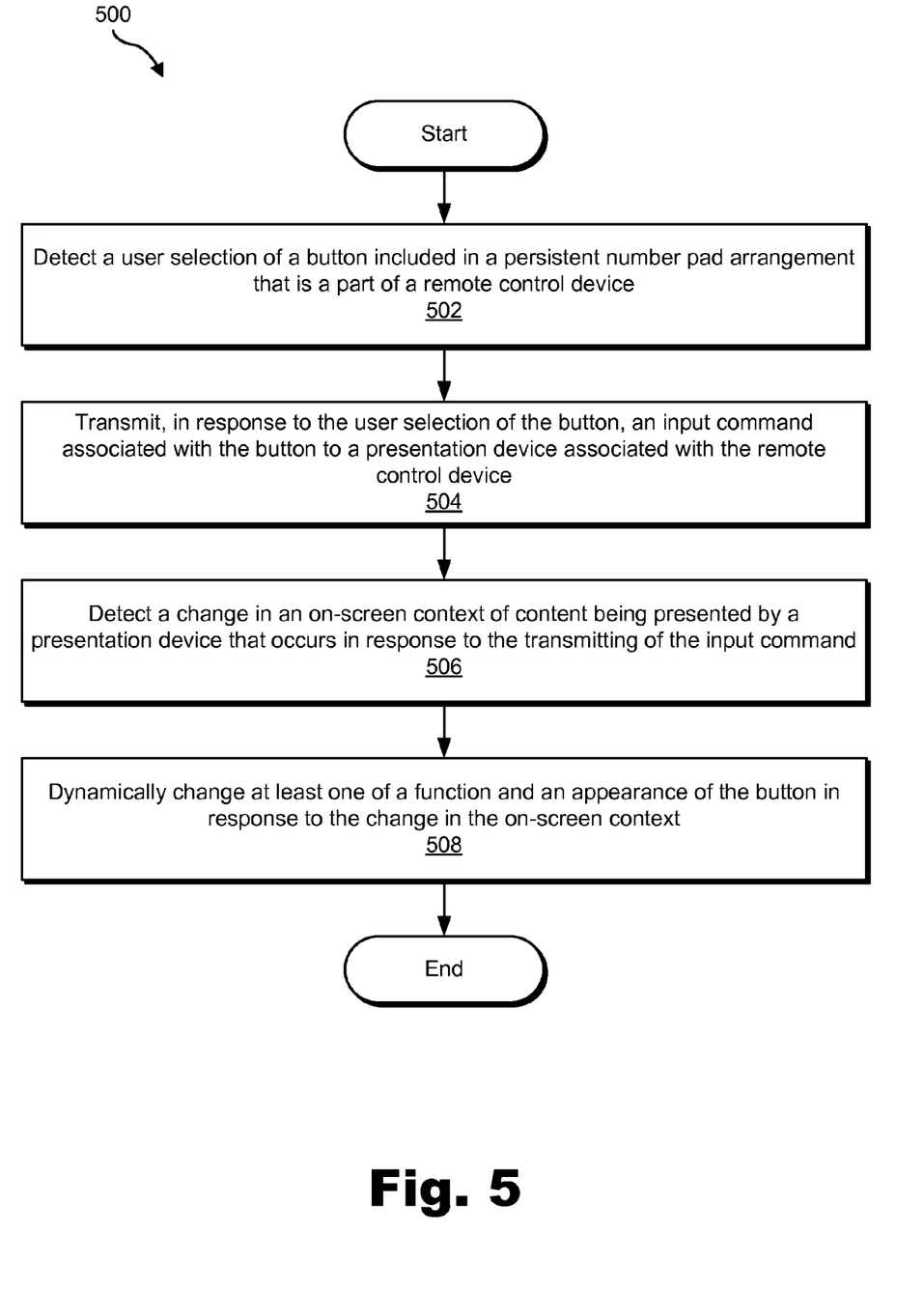
FIG. 5 illustrates another exemplary dynamic remote control method according to principles described herein.

FIG. 5 illustrates another exemplary dynamic remote control method 500. While FIG. 5 illustrates exemplary steps according to one embodiment, other embodiments may omit, add to, reorder, and/or modify any of the steps shown in FIG. 5. The steps shown in FIG. 5 may be performed by any component or combination of components of system 100, remote control device 202, presentation device 204, and/or server device 302.

In step 502, a user selection of a button included in a persistent number pad arrangement that is a part of a remote control device is detected. Step 502 may be performed in any of the ways described herein.

In step 504, an input command associated with the button is transmitted to a presentation device associated with the remote control device in response to the user selection of the button. Step 504 may be performed in any of the ways described herein.

In step 506, a change in an on-screen context of content being presented by a presentation device that occurs in response to the transmitting of the input command is detected. Step 506 may be performed in any of the ways described herein.

In step 508, at least one of a function and an appearance of the button is dynamically changed in response to the change in the on-screen context. Step 508 may be performed in any of the ways described herein.

Various implementations of the systems and methods described herein will now be presented. It will be recognized that these implementations are merely illustrative of the many different possible implementations of the systems and methods described herein.

Figure 6:
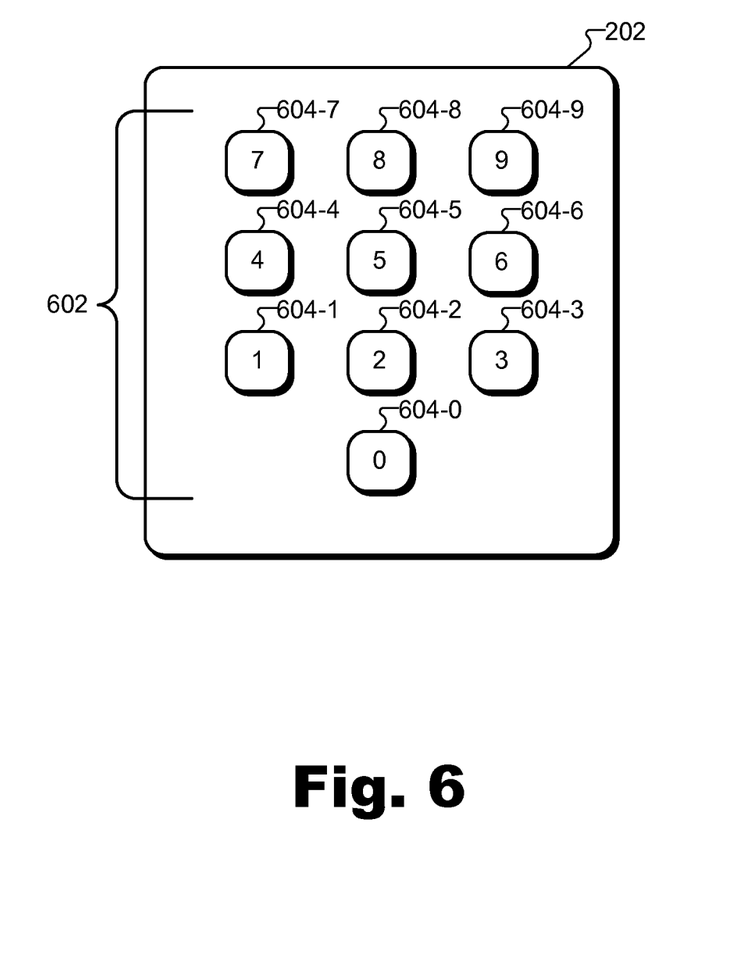
FIGS. 6-11 illustrate exemplary remote control devices that may be used according to principles described herein.

FIG. 6 illustrates an exemplary remote control device 202 with a persistent number pad arrangement 602 disposed thereon. Remote control device 202 may be associated with (e.g., configured to control) a particular presentation device. As shown, persistent number pad arrangement 602 includes ten buttons 604 (e.g., buttons 604-0 through 604-9) each associated with a particular numerical digit included in the range of 0 to 9. It will be recognized that persistent number pad arrangement 602 may include additional or alternative buttons (e.g., a star ("*") and/or a pound ("#") button) as may serve a particular implementation.

In some examples, remote control device 202 may include persistent number pad arrangement 602 to the exclusion of one or more other buttons located on traditional remote control devices. For example, remote control device 202 may not include a dedicated directional pad and/or one or more dedicated trick play buttons. In some implementations, remote control device 202 may not include any other buttons other than those included in persistent number pad arrangement 602. In this case, a user may select one or more of buttons 604 to power up (i.e., turn on) a presentation device and direct the presentation device to perform any subsequent operation.

In some examples, the on-screen context of content being presented by the presentation device associated with remote control device 202 may change to a context in which directional pad input is most likely. For example, the presentation device may switch from presenting a television program to presenting an interactive program guide or any other type of content that accepts directional pad input. In response, system 100 may dynamically change the function and/or appearance of one or more buttons 604 so that the buttons 604 may be used to provide directional pad input.

Figure 7:
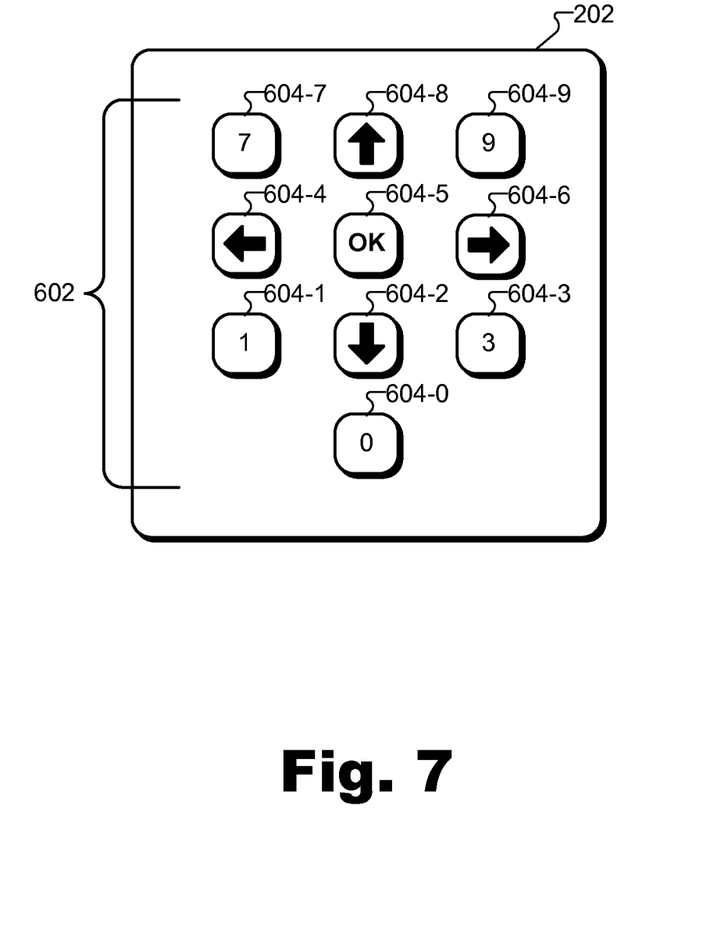

To illustrate, FIG. 7 shows remote control device 202 after a function and an appearance of a subset of buttons 604 have been changed in response to a change in an on-screen context to a context that accepts directional pad input. As shown, buttons 604-2, 604-4, 604-5, 604-6, and 604-8 are now associated with directional pad functions. In particular, button 604-2 is now associated with an "arrow down" function, button 604-4 is now associated with an "arrow left" function, button 604-5 is now associated with an "OK" function, button 604-6 is now associated with an "arrow right" function, and button 604-8 is now associated with an "arrow up" function. In this state, the user may select one or more of buttons 604-2, 604-4, 604-5, 604-6, and 604-8 to provide directional pad input to the presentation device.

As shown in FIG. 7, the appearance of buttons 604-2, 604-4, 604-5, 604-6, and 604-8 has also been changed in response to the change in on-screen context. In particular, button 604-2 is now labeled with a down arrow instead of the number "2", button 604-4 is now labeled with a left arrow instead of the number "4", button 604-5 is now labeled with "OK" instead of the number "5", button 604-6 is now labeled with a right arrow instead of the number "6", and button 604-8 is now labeled with an up arrow instead of the number "8".

The labels of buttons 604 may be changed in any suitable manner as may serve a particular implementation. For example, buttons 604 and/or a surface of remote control device 202 may employ liquid crystal display ("LCD") technology, electrophoretic (e.g., bi-stable e-paper or e-ink) technology, or any other type of technology configured to facilitate selective display of different labels associated with each button 604. Additionally or alternatively, buttons 604 may employ one or more types of backlighting technology configured to illuminate a desired label depending on particular function associated with the buttons 604.

Figure 8:
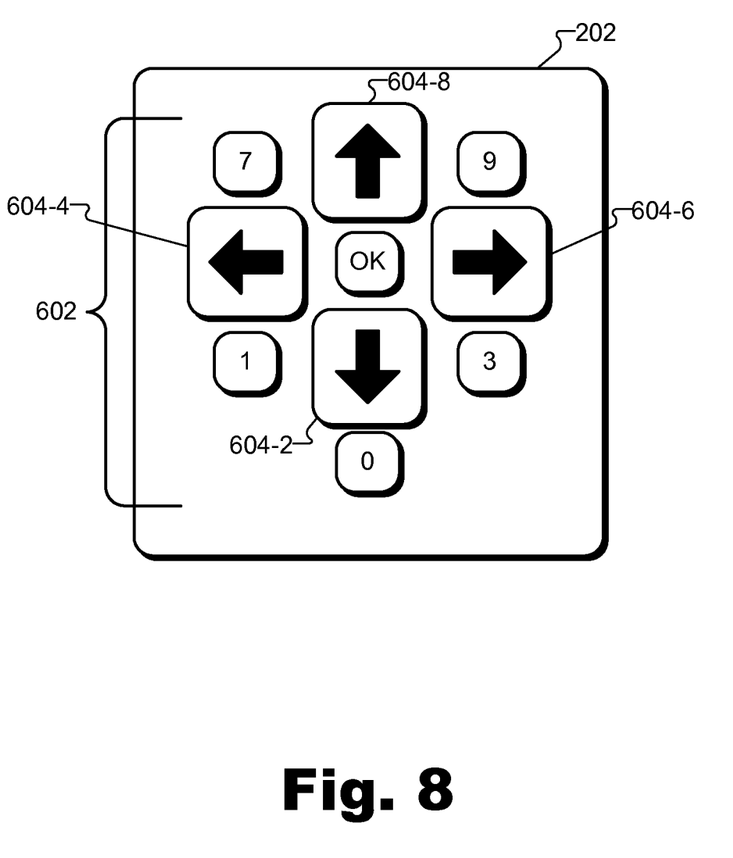

The appearance of buttons 604 may be changed in any other suitable manner as may serve a particular implementation. For example, FIG. 8 shows an exemplary implementation of remote control device 202 similar to that shown in FIG. 7, but wherein a size of buttons 604-2, 604-4, 604-6, and 604-8 has additionally been changed in response to the change in on-screen context. In particular, the size of buttons 604-2, 604-4, 604-6, and 604-8 has been increased relative to the size of the other buttons 604 included in persistent number pad arrangement 602. Such an increase in size may make it easier for the user to provide directional pad input to the presentation device. A size of buttons 604 may be adjusted in any suitable manner. For example, remote control device 604 may include one or more mechanical means (e.g., inflation devices, motors, etc.) configured to expand or contract buttons 604 in response to a change in context. Additionally or alternatively, if remote control device 202 is implemented by a mobile access device executing an application configured to emulate a dedicated remote control device, a size of buttons 604 may be changed by modifying graphical depictions of buttons 604 and associating an additional number of touch pad sensors with buttons 604.

Figure 9:
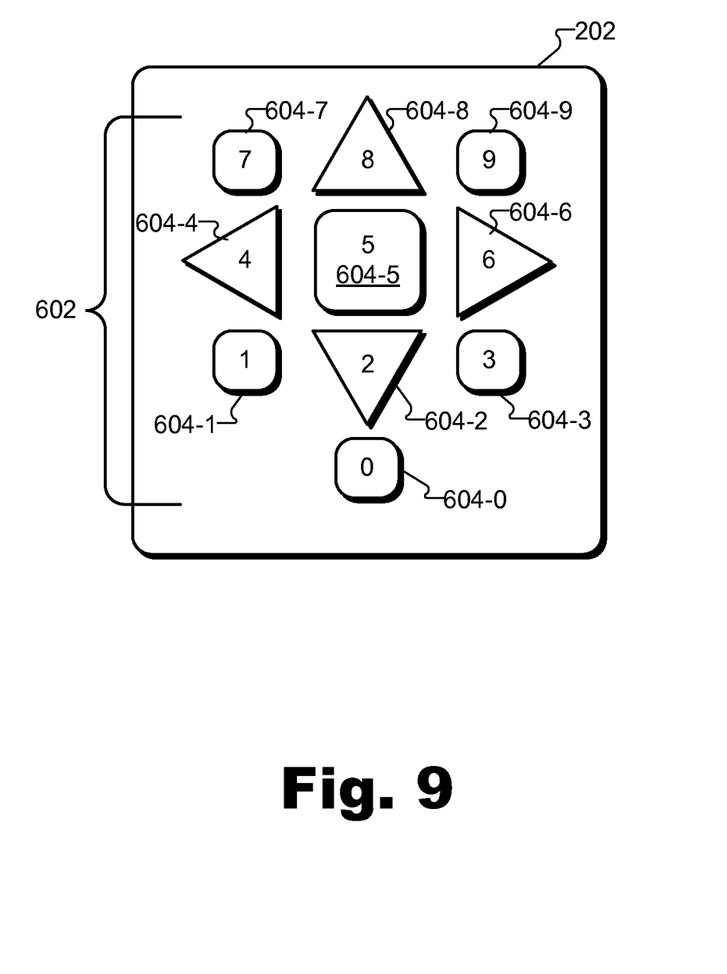

In some alternative embodiments, the size of each button 604 is fixed. FIG. 9 illustrates an exemplary implementation wherein remote control device 202 includes buttons 604 having fixed sizes. As shown in FIG. 9, some of buttons 604 (e.g., button 604-2) may have different shapes and sizes compared to other buttons 604 (e.g., button 604-1).

As a further example, the on-screen context of content being presented by the presentation device associated with remote control device 202 may change to a context in which gaming device input is most likely. For example, the presentation device may switch from presenting a television program to presenting an interactive video game that accepts gaming device input. In response, system 100 may dynamically change the function and/or appearance of one or more buttons 604 so that the buttons 604 may be used to provide the gaming device input.

Figure 10:
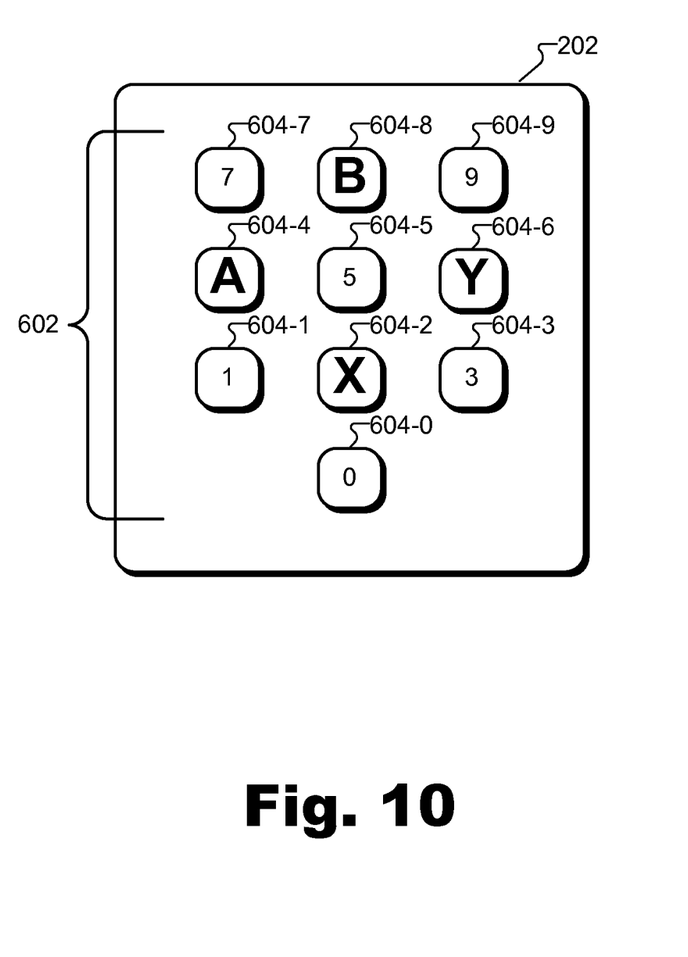

To illustrate, FIG. 10 shows remote control device 202 after a function and an appearance of a subset of buttons 604 have been changed in response to a change in an on-screen context to a context that accepts directional pad input. As shown, buttons 604-2, 604-4, 604-6, and 604-8 are now associated with gaming device functions. In particular, button 604-2 is now associated with an "X" input button function, button 604-4 is now associated with an "A" input button function, button 604-6 is now associated with a "Y" input button function, and button 604-8 is now associated with a "B" input button function. In this state, the user may select one or more of buttons 604-2, 604-4, 604-6, and 604-8 to provide gaming device input to the presentation device.

As a further example, the on-screen context of content being presented by the presentation device associated with remote control device 202 may change to a context in which media content trick play input is most likely. For example, the presentation device may switch from presenting an interactive program guide to presenting a recorded media content instance. In response, system 100 may dynamically change the function and/or appearance of one or more buttons 604 so that the buttons 604 may be used to provide the trick play input.

Figure 11:
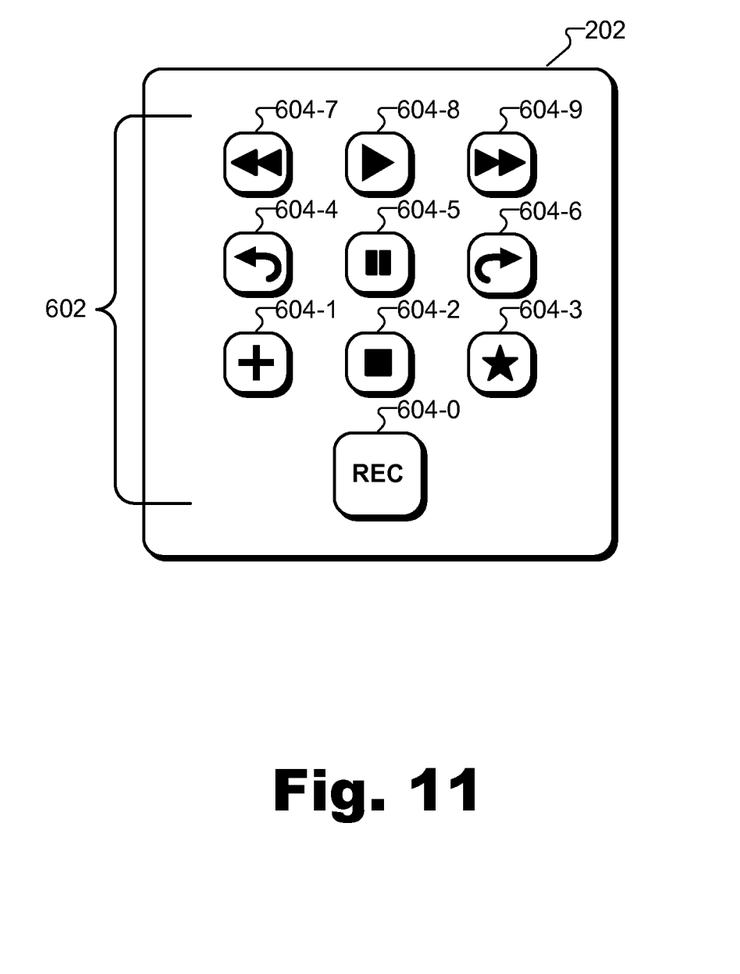

To illustrate, FIG. 11 shows remote control device 202 after a function and an appearance of buttons 604 have been changed in response to a change in an on-screen context to a context that accepts trick play input. As shown, each of buttons 604 is now associated with a particular type of trick play function (e.g., rewind, play, fast forward, pause, etc.). In this state, the user may select one or more of buttons 604 to provide trick play input to the presentation device.

As mentioned, system 100 may be configured to dynamically change the appearance of a button by changing a relative height of the button with respect to one or more other buttons included in the persistent number pad arrangement. For example, the button may be "raised up" so that the button is relatively more accessible than other buttons included in the persistent number pad arrangement. The relative height of a button may be adjusted in any suitable manner as may serve a particular implementation. For example, remote control device 202 may include one or more mechanical means (e.g., inflation devices, elevating devices, levers, gears, motors, etc.) configured to adjust the height of the button.

As also mentioned, system 100 may be implemented entirely by a remote control device. For example, a remote control device may include a plurality of buttons positioned in a persistent number pad arrangement and a processor communicatively coupled to the buttons. The processor may be configured to detect a change in an on-screen context of content being presented by a presentation device and dynamically change at least one of a function and an appearance of one or more of the buttons in response to the change in the on-screen context.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 12:
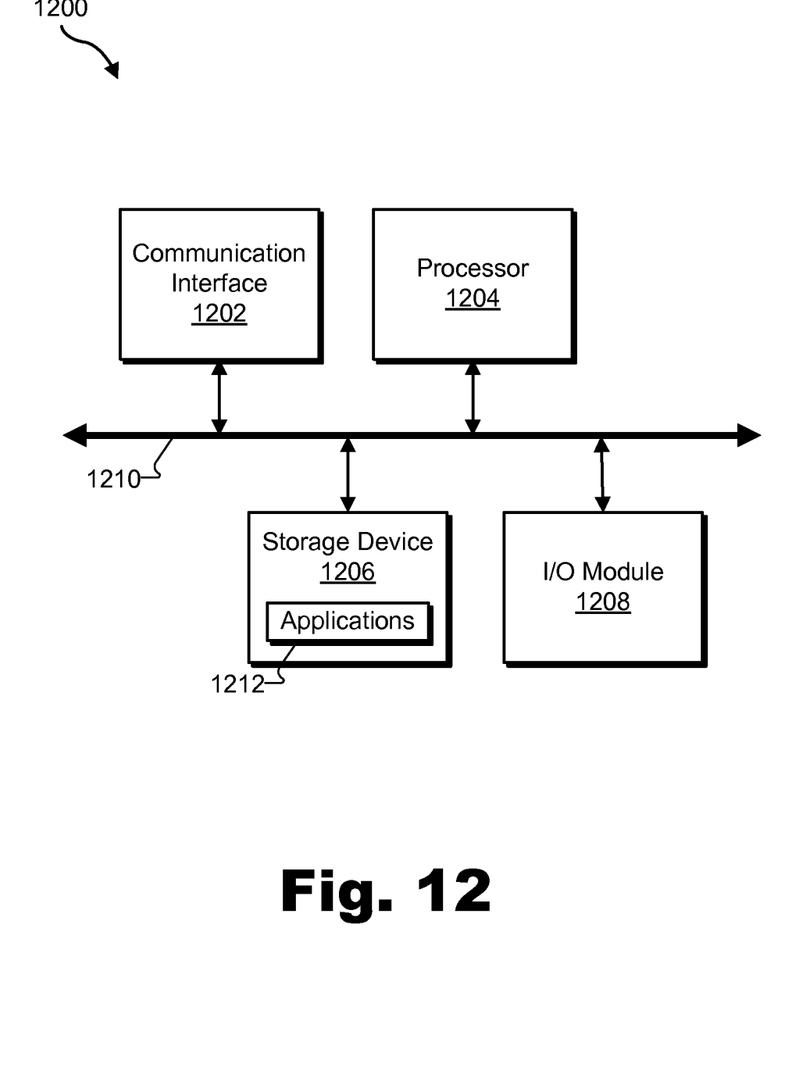
FIG. 12 illustrates an exemplary computing device according to principles described herein.

FIG. 12 illustrates an exemplary computing device 1200 that may be configured to perform one or more of the processes described herein. As shown in FIG. 12, computing device 1200 may include a communication interface 1202, a processor 1204, a storage device 1206, and an input/output ("I/O") module 1208 communicatively connected via a communication infrastructure 1210. While an exemplary computing device 1200 is shown in FIG. 12, the components illustrated in FIG. 12 are not intended to be limiting. Additional or alternative components may be used in other embodiments. Components of computing device 1200 shown in FIG. 12 will now be described in additional detail.

Communication interface 1202 may be configured to communicate with one or more computing devices. Examples of communication interface 1202 include, without limitation, a wired network interface (such as a network interface card), a wireless network interface (such as a wireless network interface card), a modem, an audio/video connection, and any other suitable interface.

Processor 1204 generally represents any type or form of processing unit capable of processing data or interpreting, executing, and/or directing execution of one or more of the instructions, processes, and/or operations described herein. Processor 1204 may direct execution of operations in accordance with one or more applications 1212 or other computer-executable instructions such as may be stored in storage device 1206 or another computer-readable medium.

Storage device 1206 may include one or more data storage media, devices, or configurations and may employ any type, form, and combination of data storage media and/or device. For example, storage device 1206 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof.

Electronic data, including data described herein, may be temporarily and/or permanently stored in storage device 1206. For example, data representative of one or more executable applications 1212 (which may include, but are not limited to, one or more of the software applications described herein) configured to direct processor 1204 to perform any of the operations described herein may be stored within storage device 1206. In some examples, data may be arranged in one or more databases residing within storage device 1206.

I/O module 1208 may be configured to receive user input and provide user output and may include any hardware, firmware, software, or combination thereof supportive of input and output capabilities. For example, I/O module 1208 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1208 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1208 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1200. For example, one or more applications 1212 residing within storage device 1206 may be configured to direct processor 1204 to perform one or more processes or functions associated with context detection facility 102 and/or number pad management facility 104. Likewise, storage facility 106 may be implemented by or within storage device 1206.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    detecting, by a dynamic remote control system, a change in an on-screen context of content being presented by a presentation device;
    dynamically changing, by the dynamic remote control system, a function of a button of a plurality of buttons included in a persistent number pad arrangement on a remote control device in response to the change in the on-screen context; and
    maintaining, by the dynamic remote control system, the plurality of buttons included in the persistent number pad arrangement in response to the dynamic changing of the function of the at least one button,
    wherein the plurality of buttons included in the persistent number pad arrangement on the remote control device are configured to be associated with numerical digits included in a range of zero to nine.

2. The method of claim 1, further comprising dynamically changing, by the dynamic remote control subsystem, an appearance of the button in response to the change in the on-screen context.

3. The method of claim 1, wherein the dynamically changing of the function of the button comprises associating the button with a directional pad function, a gaming device function, or a media content trick play function.

4. The method of claim 1, wherein the dynamically changing of the function of the button comprises reassigning the button to a new type of input command that is transmitted to the presentation device in response to user selection of the button.

5. The method of claim 1, wherein the dynamically changing of the function of the button comprises directing the presentation device to change a manner in which the presentation device interprets an input command received from the remote control device in response to user selection of the button.

6. The method of claim 1, further comprising dynamically changing, by the dynamic remote control system, a function of one or more additional buttons included in the persistent number pad arrangement in response to the change in the on-screen context.

7. The method of claim 1, wherein the remote control device is physically separate from the presentation device.

8. The method of claim 1, wherein the plurality of buttons included in the persistent number pad arrangement comprises a plurality of physically distinct buttons disposed on a surface of the remote control device.

9. The method of claim 1, wherein the remote control device comprises a mobile device configured to execute an application emulating a physical remote control device associated with the presentation device.

10. The method of claim 1, further comprising:
    logging, by the dynamic remote control system, data representative of an interaction by a user with the button over a period of time; and
    dynamically changing, by the dynamic remote control system, an appearance of the button over the period of time based on the logged data.

11. The method of claim 1, embodied as computer-executable instructions on at least one non-transitory computer-readable medium.

12. The method of claim 2, wherein the change in appearance of the button is configured to depict the change in function of the button.

13. The method of claim 2, wherein the dynamically changing of the appearance of the button comprises changing at least one of a physical size of the button, a relative height of the button with respect to one or more other buttons included in the persistent number pad arrangement, a color of the button, and a label of the button.

14. A method comprising:
    detecting, by a dynamic remote control system, a user selection of a button of a plurality of buttons included in a persistent number pad arrangement that is a part of the remote control device;
    transmitting, by the dynamic remote control system in response to the user selection of the button, an input command associated with the button to a presentation device associated with the remote control device;
    detecting, by the dynamic remote control system, a change in an on-screen context of content being presented by a presentation device that occurs in response to the transmitting of the input command;

dynamically changing, by the dynamic remote control system, at least one of a function and an appearance of the button in response to the change in the on-screen context; and maintaining, by the dynamic remote control system, the plurality of buttons included in the persistent number pad arrangement in response to the dynamic changing of the at least one of the function and the appearance of the button, wherein the plurality of buttons included in the persistent number pad arrangement are configured to be associated with numerical digits included in a range of zero to nine.

15. The method of claim 14, wherein the dynamically changing of the function of the button comprises associating the button with a directional pad function, a gaming device function, or a media content trick play function.

16. The method of claim 14, wherein the dynamically changing of the function of the button comprises reassigning the button to a new type of input command that is transmitted to the presentation device in response to another user selection of the button.

17. The method of claim 14, wherein the dynamically changing of the appearance of the button comprises changing at least one of a physical size of the button, a relative height of the button with respect to one or more other buttons included in the persistent number pad arrangement, a color of the button, and a label of the button.

18. The method of claim 14, wherein the plurality of buttons included in the persistent number pad arrangement comprises a plurality of physically distinct buttons disposed on a surface of the remote control device.

19. The method of claim 14, embodied as computer-executable instructions on at least one non-transitory computer-readable medium.

20. A system comprising:
a context detection facility configured to detect a change in an on-screen context of content being presented by a presentation device; and
a number pad management facility communicatively coupled to the context detection facility and configured to dynamically change a function of a button of a plurality of buttons included in a persistent number pad arrangement on a remote control device associated with the presentation device in response to the change in the on-screen context and maintain the plurality of buttons included in the persistent number pad arrangement in response to the dynamic changing of the function of the button,
wherein the plurality of buttons included in the persistent number pad arrangement on the remote control device are configured to be associated with numerical digits included in a range of zero to nine.

21. The system of claim 20, wherein the number pad management facility is further configured to dynamically change an appearance of the button in response to the change in the on-screen context.

22. A remote control device comprising:
a plurality of buttons positioned in a persistent number pad arrangement and configured to be associated with numerical digits included in a range of zero to nine; and
a processor communicatively coupled to the buttons and configured to
detect a change in an on-screen context of content being presented by a presentation device,
dynamically change at least one of a function and an appearance of one or more of the buttons in response to the change in the on-screen context, and
maintain the plurality of buttons included in the persistent number pad arrangement in response to the dynamic changing of the at least one of the function and the appearance of the one or more of the buttons.

* * * * *